United States Patent
Van Den Bosch et al.

(10) Patent No.: US 7,198,283 B2
(45) Date of Patent: Apr. 3, 2007

(54) CART HANDLE ASSEMBLY

(75) Inventors: Bryan Van Den Bosch, Alliston (CA); Roy Potts, Stayner (CA); John Mariciak, New Lowell (CA); Bryan Jennings, Caledon (CA); Gary Jennings, Caledon (CA)

(73) Assignee: Honda Motor Co., Ltd., Tokyo (JP)

( * ) Notice: Subject to any disclaimer, the term of this patent is extended or adjusted under 35 U.S.C. 154(b) by 216 days.

(21) Appl. No.: 10/794,291

(22) Filed: Mar. 5, 2004

(65) Prior Publication Data

US 2005/0194754 A1    Sep. 8, 2005

(51) Int. Cl.
*B60D 1/00* (2006.01)

(52) U.S. Cl. ............... 280/504; 280/400; 280/515; 280/490.1

(58) Field of Classification Search ........... 280/400, 280/504, 515, 47.34, 490.1
See application file for complete search history.

(56) References Cited

U.S. PATENT DOCUMENTS

| | | | |
|---|---|---|---|
| 2,072,391 A * | 3/1937 | Varney, Jr. ............... | 280/515 |
| 2,470,531 A | 5/1949 | Suhl et al. | |
| 2,548,259 A | 4/1951 | Hall | |
| 2,757,020 A | 7/1956 | Grelind | |
| 2,757,021 A * | 7/1956 | Moon ........................ | 280/515 |
| 2,787,478 A * | 4/1957 | Schmidt .................... | 280/515 |
| 2,809,055 A * | 10/1957 | Briggs ...................... | 280/504 |
| 2,935,331 A | 5/1960 | Ledgerwood | |
| 2,970,852 A * | 2/1961 | Doll ........................ | 280/515 |
| 3,326,575 A | 6/1967 | Shepley | |
| 3,664,465 A * | 5/1972 | Holland .................... | 188/10 |
| 4,144,655 A | 3/1979 | Harris | |
| 4,548,259 A * | 10/1985 | Tezuka et al. ........... | 165/263 |
| 5,083,808 A | 1/1992 | Torii | |
| 5,261,687 A | 11/1993 | Bergman | |
| 5,439,069 A * | 8/1995 | Beeler ...................... | 180/11 |
| 5,573,078 A * | 11/1996 | Stringer et al. ........... | 180/19.2 |
| 6,244,366 B1 * | 6/2001 | Otterson et al. .......... | 180/11 |
| 6,415,475 B1 | 7/2002 | Dixon | |
| 6,520,514 B2 | 2/2003 | Clegg | |
| 2002/0105164 A1 | 8/2002 | Hobdy et al. | |

* cited by examiner

*Primary Examiner*—J. Allen Shriver
(74) *Attorney, Agent, or Firm*—Rankin, Hill, Porter & Clark LLP

(57) ABSTRACT

A cart assembly comprises an undercarriage supporting a cart frame, the undercarriage having one end and a connecting portion extending from cart frame and/or the undercarriage for connecting the cart assembly with an adjacent article, the cart frame including a handle portion disposed at an elevation for manipulation by a human operator in an upright standing position to steer or otherwise control the cart assembly, and an actuating member mounted on the handle portion for actuating the connecting portion between a first connecting position and a second disconnecting position.

50 Claims, 15 Drawing Sheets

CART HANDLE ASSEMBLY

BACKGROUND OF THE INVENTION

1. Field of the Invention

The present invention relates to cart assemblies and more particularly to methods of manipulating connecting portions thereon.

2. Description of the Related Art

Carts are widely used in manufacturing and distribution facilities for moving articles from place to place. It is not uncommon to gang them with other carts to form cart trains. This is conventionally done by joining a tongue on a trailing cart with a pin on a leading cart. The tongue and pin are normally but a few inches off the ground surface, thereby requiring an operator to bend down to manipulate the tongue to its connected or disconnected positions. Therefore, in the daily routine handling of production parts, for example, the operator is required to bend over and lift the tongue which can itself weigh in the order of ten or more pounds. Despite the efforts of to minimize back strain or injury, the awkward posture to manipulate the tongue many times in a single shift presents a serious risk of back or other body injury to the operator.

It is therefore an object of the present invention to address this problem with a novel cart assembly.

SUMMARY OF THE INVENTION

Briefly stated, the invention involves a cart assembly, comprising an undercarriage supporting a cart frame, the undercarriage having one end and a connecting portion extending from cart frame and/or the undercarriage for connecting the cart assembly with an adjacent article, the cart frame including a handle portion disposed at an elevation for manipulation by a human operator in an upright standing position to steer or otherwise control the cart assembly, and an actuating member mounted on the handle portion for actuating the connecting portion between a first connecting position and a second disconnecting position.

In an embodiment, the connecting portion further comprises a tongue and an anchor member to join the tongue with the cart frame and/or the undercarriage. The tongue is movable between a generally horizontal first connecting position and a second inclined disconnecting position. However, the connecting portion may be of some other structure other than a tongue, such as a frame structure with multiple mounting points.

In an embodiment, the actuating member is operatively connected to the tongue, so that displacement of the actuating member by the operator causes a corresponding displacement of the tongue.

In an embodiment, the tongue has a first end portion providing one or more pivot pins for pivoted coupling with the anchor member. In this case, the anchor member includes a pair of adjacent and outwardly extending webs, each web having a passage to receive the pivot pin. The first end portion has a transverse passage to receive the pivot pin therein. In this case, the pivot pin extends through the transverse passage and beyond the first end portion to extend into each of the passages. The handle portion has a lateral portion, the actuating portion having a sleeve portion mounted on an outer surface of the lateral portion. In this case, the handle portion includes a pair of upright portions, each having an upper end which is joined with a corresponding free end of the lateral portion. The pivot pin may itself also be welded or otherwise fastened to the tongue as desired.

In an embodiment, a tension member extends between the actuating member and the tongue and a plate member is secured to the tongue adjacent the first end portion. In this case, the plate member has a passage to receive the tension member therein. The tension member includes one or more ropes, cords, chains, cables, and straps made from metal, glass, plastics or a combination thereof.

In an embodiment, the actuating portion includes an actuating arm extending outwardly from the sleeve portion and at an elevation permitting the actuating arm to be manipulated by the human operator in the upright standing position. The actuating arm may include a hoop member extending outwardly from the sleeve, the hoop member having first and second positions corresponding to the first and second positions of the tongue member. In one example, the hoop member hangs downwardly from the lateral portion in one position and is generally horizontal or inclined in the second position.

In an embodiment, the adjacent article is another cart assembly.

In an embodiment, the tongue has a central portion, a first end portion for a pivot coupling with the cart frame and/or undercarriage for movement about a pivot axis and a second end portion providing a formation for connecting the cart assembly with the adjacent article and means for securing the first and second end portions on opposite ends of the central portion. In this case, the first and second end portions may be formed by casting or molding or using other machining and/or fabricating techniques.

In an embodiment, the central portion is a frame member with an inner passage and one or both of the first and second end portions having complementary formations for coupling with the frame member. In an embodiment, the central portion is a hollow frame member with an inner passage and one or both of the first and second end portions has a projection to extend into the inner passage. If desired, the hollow frame member may be rectangular, square, circular or some other cross section. Alternatively, the central portion may be of a solid in cross section with or without one or more flanges extending outwardly therefrom.

In an embodiment, the anchor member has a base portion with an outer surface for mounting to the cart frame and/or undercarriage and an inner surface. Engaging means is provided for engaging the first end portion in the second disconnecting position. The engaging means may include an abutment and the first end portion may include a projection to be adjacent the abutment in the second disconnecting position. In this case, in the second disconnecting position, the tongue is in an upright storage position with the projection adjacent the abutment to prevent rotation of the tongue about the pivot axis. The tongue is then movable between the upright storage position and an intermediate position wherein, in the intermediate position, the projection is spaced from the abutment.

In an embodiment, the first end portion has one or more pivot members and the anchor member has a pair of webs with pivot passages to receive the one or more pivot members. In this case, the pivot passages in the webs of the anchor portion are dimensioned to permit the one or more pivot members to be displaced along the web portions between the upright storage position and the intermediate position. The base portion includes an inner surface having a cavity adjacent the abutment to receive a first end portion in the first connecting position.

In another of its aspects, the present invention provides a cart assembly comprising an undercarriage supporting a cart frame, a tongue for connecting the cart assembly with an adjacent article, and an anchor member to join the tongue with the cart frame and/or the undercarriage, the tongue having an end portion for a pivot coupling with the anchor member for movement about a pivot axis and a second end portion providing a formation for connecting the cart assembly with the adjacent article, the first end portion including a projection for movement along a travel path while the tongue travels from a first operative position to a second operative position, the anchor member further comprising abutment means for interrupting the travel path when the tongue is in the first operative position to inhibit movement of the tongue.

In an embodiment, in the first operative position, the tongue is in an upright storage position. The tongue is movable between the upright storage position and a second operative position wherein the projection is spaced from the abutment element. The first end portion has one or more pivot members and the anchor member has a pair of webs with pivot passages to receive the one or more pivot members. The pivot passages are dimensioned to permit the one or more pivot members to be displaced along the web portions between the first and second operative positions. The anchor member includes a base portion having a cavity adjacent the abutment element to receive the first end portion in a third operative position. In this case, in the third operative position, the tongue is connected with the adjacent article.

In another of its aspects, the present invention provides a device for interconnecting one article with an adjacent article, comprising a central tongue portion, a first tongue end portion for a pivot coupling with one article for movement about a pivot axis and a second tongue end portion providing a formation for connecting with the adjacent article and means for securing the first and second end portions on opposite ends of the central portion.

In an embodiment, the central portion is a frame member with an inner passage and one or both of the first and second end portions has complementary formations for coupling with the frame member. In this case, the frame member is rectangular, square or circular in cross section, though other cross sections may also be employed.

In another embodiment, the central portion is solid in cross section with or without one or more flanges extending outwardly therefrom.

In another of its aspects, the present invention provides a cart assembly, comprising an undercarriage supporting a cart frame, a tongue for connecting the cart assembly with an adjacent article, the cart frame including a handle portion disposed at an elevation for manipulation by a human operator in an upright standing position to steer or otherwise control the cart assembly, and an actuating member mounted on the handle portion for movement between a first inoperative position in which the actuating member hangs downwardly from the handle portion and a second operative position, the actuating member operatively connected to the tongue by a tension member, so that displacement of the actuating member by the operator causes the tension member to lift the tongue between a first connecting position and a second disconnecting position.

In yet another of its aspects, the present invention provides a cart assembly, comprising undercarriage means, cart frame means supported by the undercarriage means, connecting means for connecting the cart frame with an adjacent article, the cart frame means including handle means disposed at an elevation for manipulation by a human operator in an upright standing position to steer or otherwise control the cart assembly, and an actuating means associated with the handle means for actuating the connecting means between a first connecting position and a second disconnecting position.

In still another of its aspects, the present invention provides a method of interconnecting a cart assembly with an adjacent article, comprising the steps of:
providing a cart frame to support transportable articles and an undercarriage supporting a cart frame;
locating a connecting portion at one end of the undercarriage;
extending the connecting portion outwardly to be connectable with an adjacent article;
providing a handle portion at an elevation so that the handle portion can be manipulated by a human operator in an upright standing position adjacent the cart assembl to steer or otherwise control the cart assembly; and
positioning an actuating member on the handle portion for actuating the connecting portion between a first connecting position and a second disconnecting position.

In still another of its aspects, the present invention provides a method of interconnecting a cart assembly with an adjacent article, comprising:
a step for providing a cart frame to support transportable articles and an undercarriage supporting a cart frame;
a step for locating a connecting portion at one end of the undercarriage;
a step for extending the connecting portion outwardly to be connectable with an adjacent article;
a step for providing a handle portion at an elevation so that the handle portion can be manipulated by a human operator in an upright standing position adjacent the cart assembly to steer or otherwise control the cart assembly; and
a step for positioning an actuating member on the handle portion for actuating the connecting portion between a first connecting position and a second disconnecting position.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
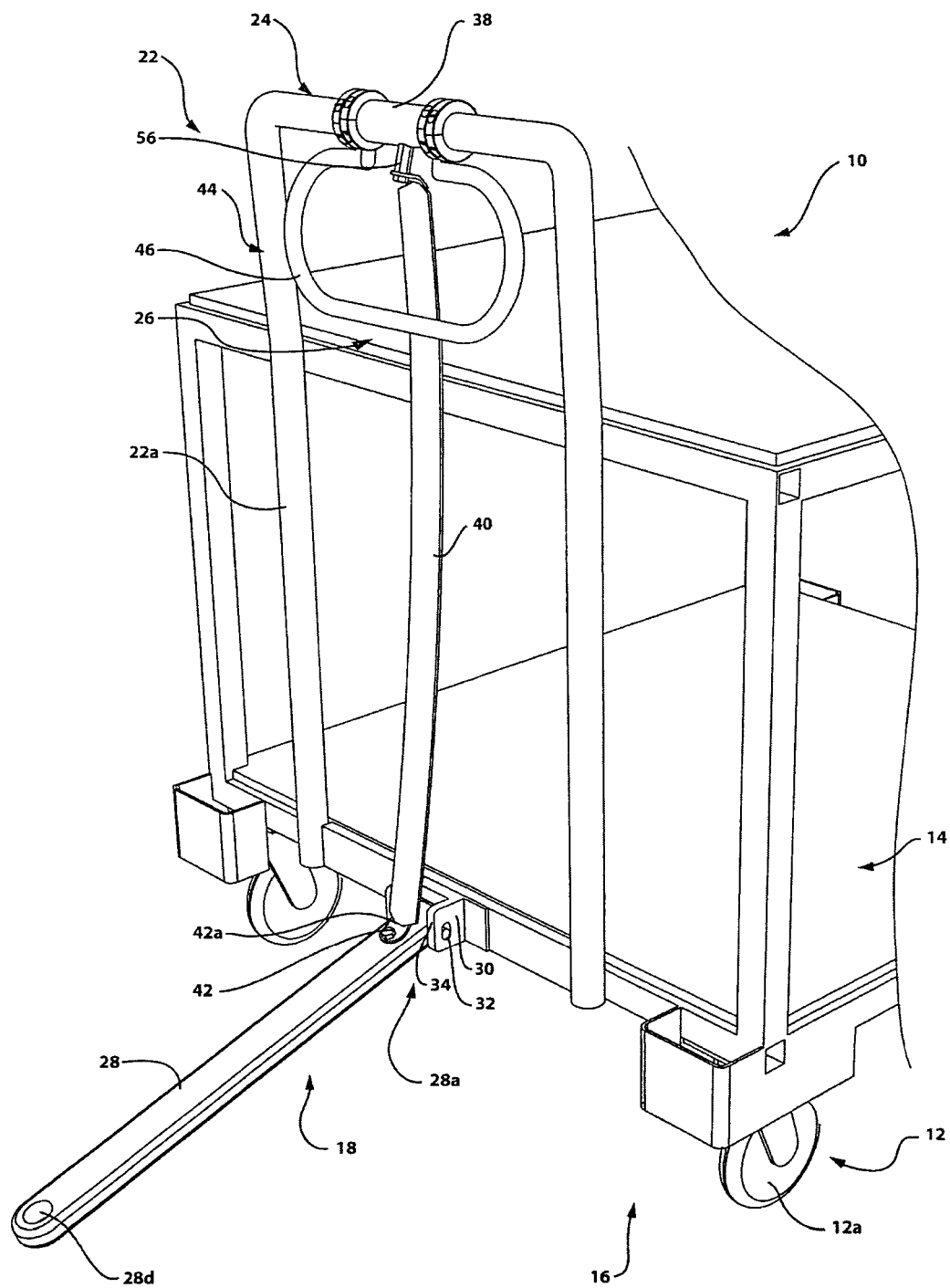
FIG. 1 is fragmentary perspective view of the cart assembly in a first operative position.
Figure 2:
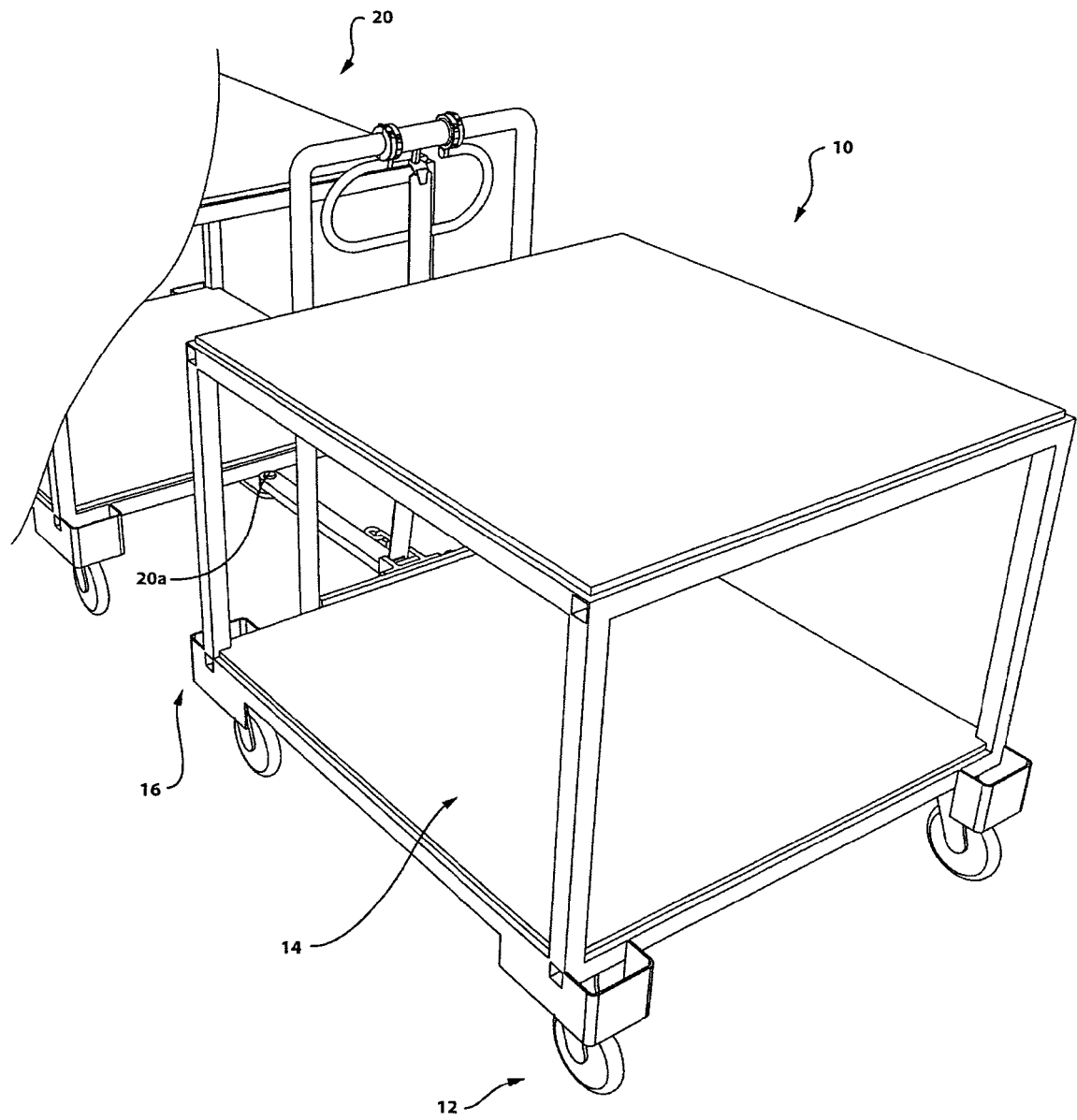
FIG. 2 is a fragmentary perspective view of a cart assembly of FIG. 1 in an operative position.

Referring to the figures starting with FIG. 1, there is a cart assembly is shown at 10 having an undercarriage 12 supporting a cart frame 14. The undercarriage 12 has one end 16 and a connecting portion 18 extends from the cart frame 14 and/or the undercarriage 12 for connecting the cart assembly 10 with an adjacent article. In this case, the adjacent article is another cart assembly 20 (as shown in FIG. 2) having a mounting point 20a such as a draw pin. The undercarriage 12 may include one or more castered wheels 12a allowing the cart assembly 10 to be manoeuvred along a ground surface. Alternatively, the undercarriage 12 may be provided with another form of steering mechanism to adjust the direction of travel of one or more wheels thereon. The undercarriage may also be provided with means other than wheels to suspend the cart assembly 10 above the ground surface, such as a track mechanism, an air cushion or the like.

The cart frame 14 includes a handle portion 22 with a pair of uprights 22a fastened to the cart frame 14 on either side of the connecting portion 18. The uprights 22a have upper ends joined to opposing ends of a lateral portion in the form of a cross bar 24. The uprights 22a and cross bar 24 are provided by a one piece tube member. The cross bar 24 is disposed at an elevation for manipulation by a human operator in an upright standing position to steer or otherwise control the cart assembly 10. An actuating member 26 is mounted on the cross bar 24 for actuating the connecting portion 18 between a first connecting position, as shown in FIG. 2, and a second disconnecting position as shown in FIG. 1. The connecting portion 18 has a tongue 28 and an anchor member 30 to join the tongue with the cart frame and/or the undercarriage 12, 14. As can be seen in FIG. 1, the actuating member 26 is operatively connected to the tongue 28, as will be described, so that displacement of the actuating member 26 by the operator causes a corresponding displacement of the tongue 28.

Figure 7:
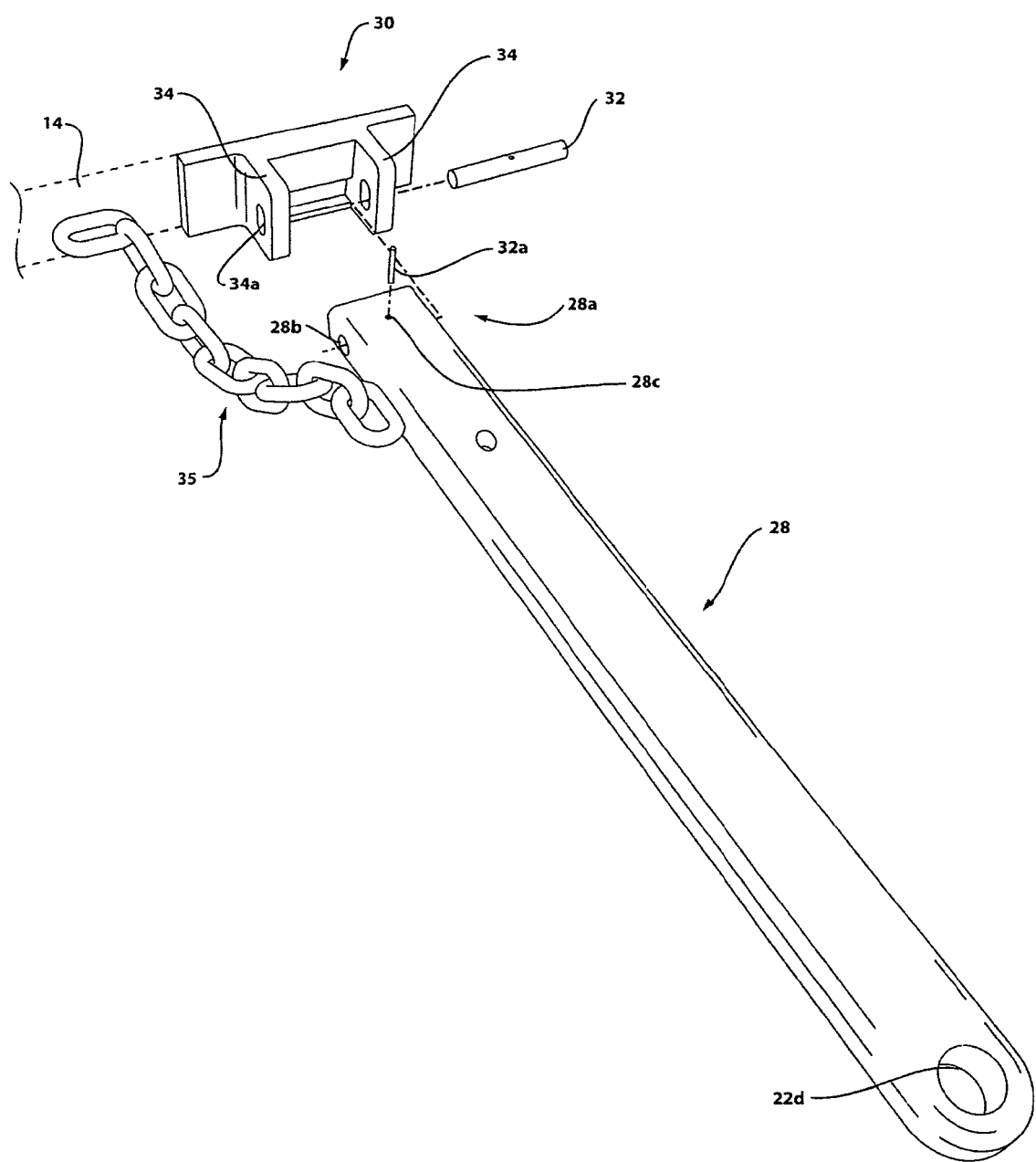
FIG. 7 is an assembly view of several components of the connecting portion of FIG. 6.

Referring to FIGS. 1 and 7, the tongue 28 has a first end portion 28a providing one or more pivot pins 32 for pivoted coupling with the anchor member 30. In this case, the anchor member 30 includes a pair of adjacent and outwardly extending webs 34, each web having a passage 34a to receive the pivot pin 32. The first end portion 28a has a transverse passage 28b to receive the pivot pin 32 therein. In this case, the pivot pin 32 extends through the transverse passage 28b and beyond the first end portion 28a on both sides thereof to extend into each of said passages 34a. The pivot pin 32 is held in passage 28b by a spring pin 32a located in passage 28c in the tongue 28. The tongue 28 is also provided with a draw passage 28d to receive the draw pin 20a therein. A chain 35 extends between the tongue 28 and the cart frame 14 as a safety measure should the pivot pin be released by accident. Referring to FIG. 1, the actuating portion 26 has a sleeve portion 38 which is mounted on an outer surface of the cross bar 24.

A tensile member 40, in this case a strap, extends between the actuating member 26 and the tongue 28 and a lower plate member 42 is secured to the tongue 28 adjacent the first end portion 28a. In this case, the lower plate member 42 has a passage 42a to receive a lower end the strap 40 therein.

Figure 3:
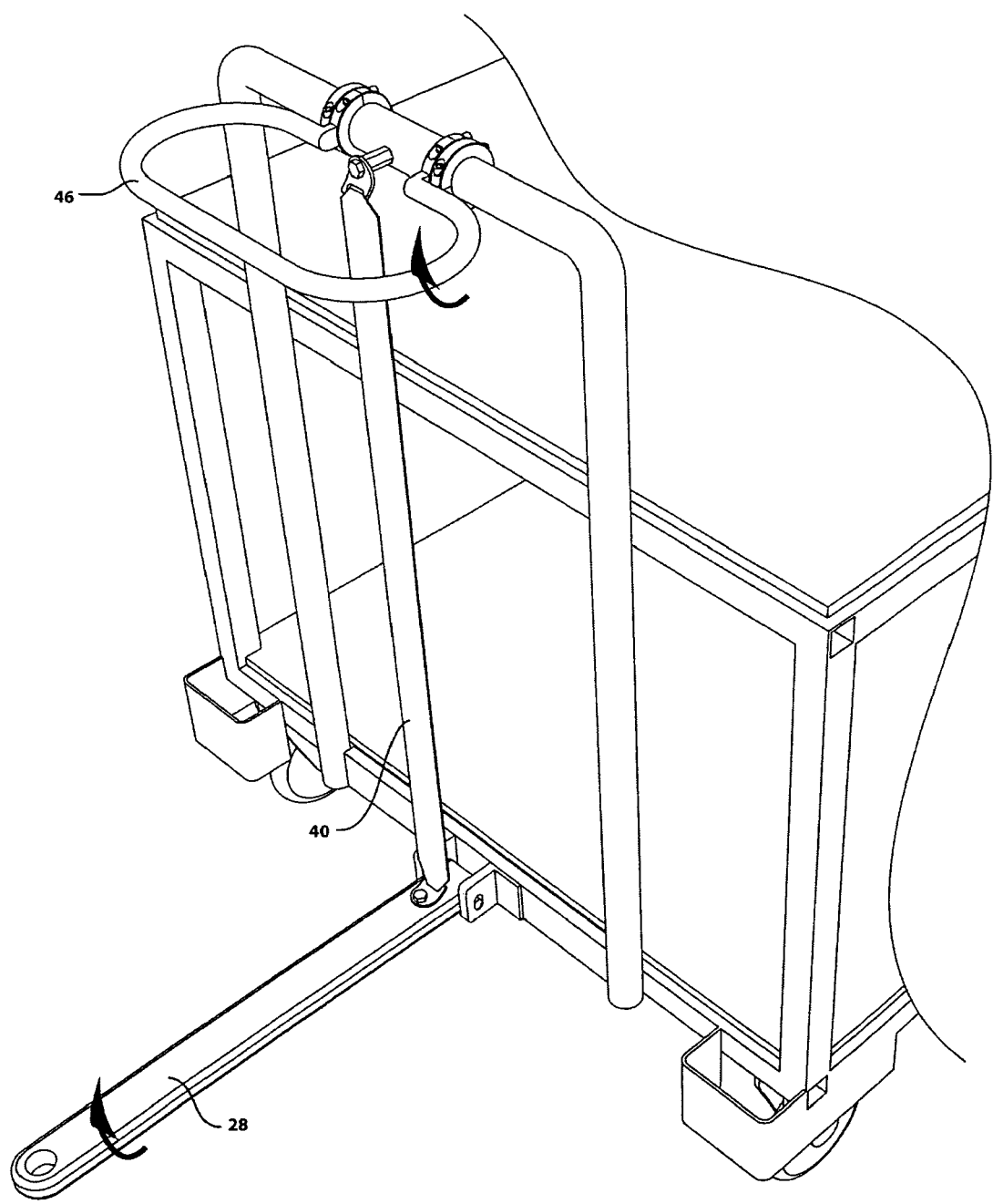
FIG. 3 is a fragmentary perspective view of the cart assembly of FIG. 1 in a second operative position.

The actuating member 26 includes an actuating arm 44 extending outwardly from the sleeve portion 38 and at an elevation permitting the actuating arm to be manipulated by the human operator in the upright standing position. In this case, the actuating arm is in the form of a hoop member 46. In one example, the hoop member 46 hangs downwardly from the cross bar 24 in a first position (as shown in FIG. 1) in which the strap 40 is loose. The hoop member 46 is movable between the first position and a generally horizontal or inclined second position, (one such position being shown in FIGS. 1b and 3), in which the hoop member 46 tensions the strap 40 to lift the tongue 28, as will be described.

Figure 4:
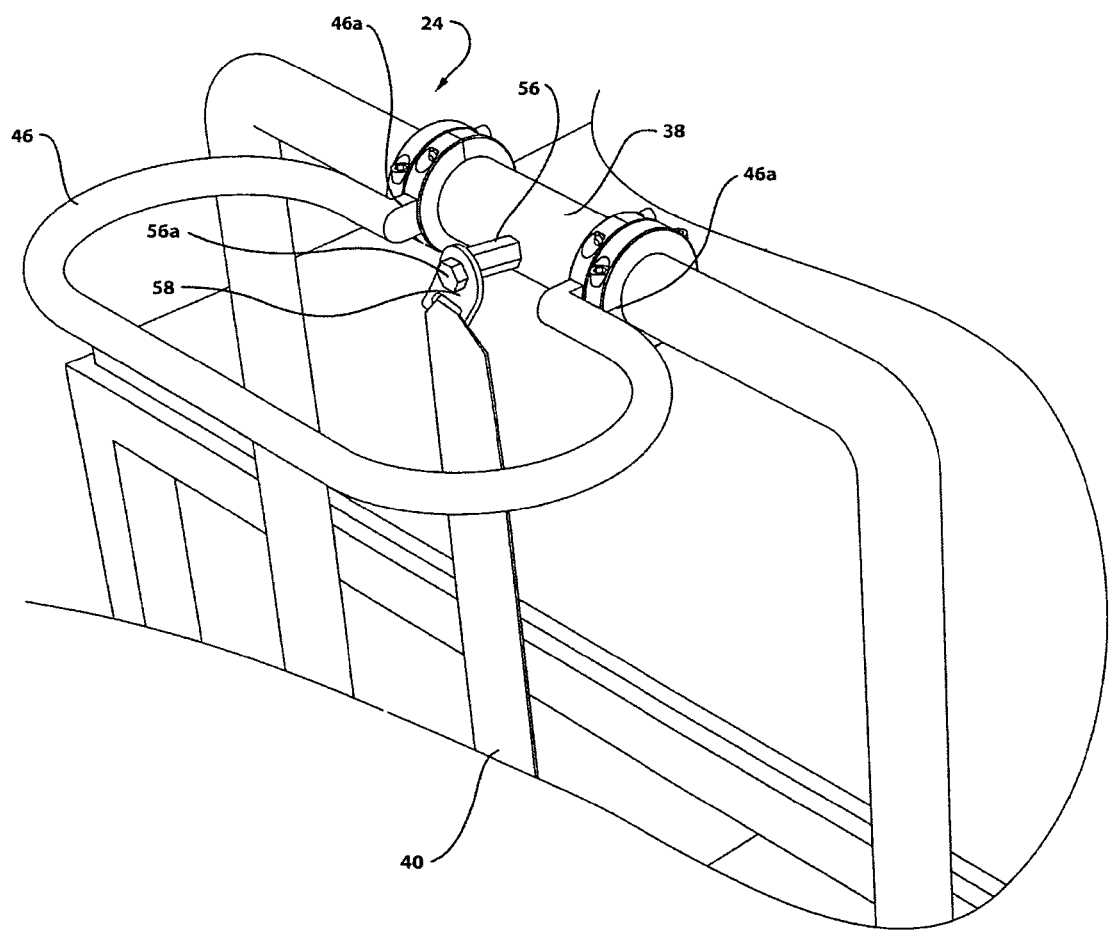
FIG. 4 is a magnified fragmentary perspective view of an actuating member of the cart assembly of FIG. 1.
Figure 5:
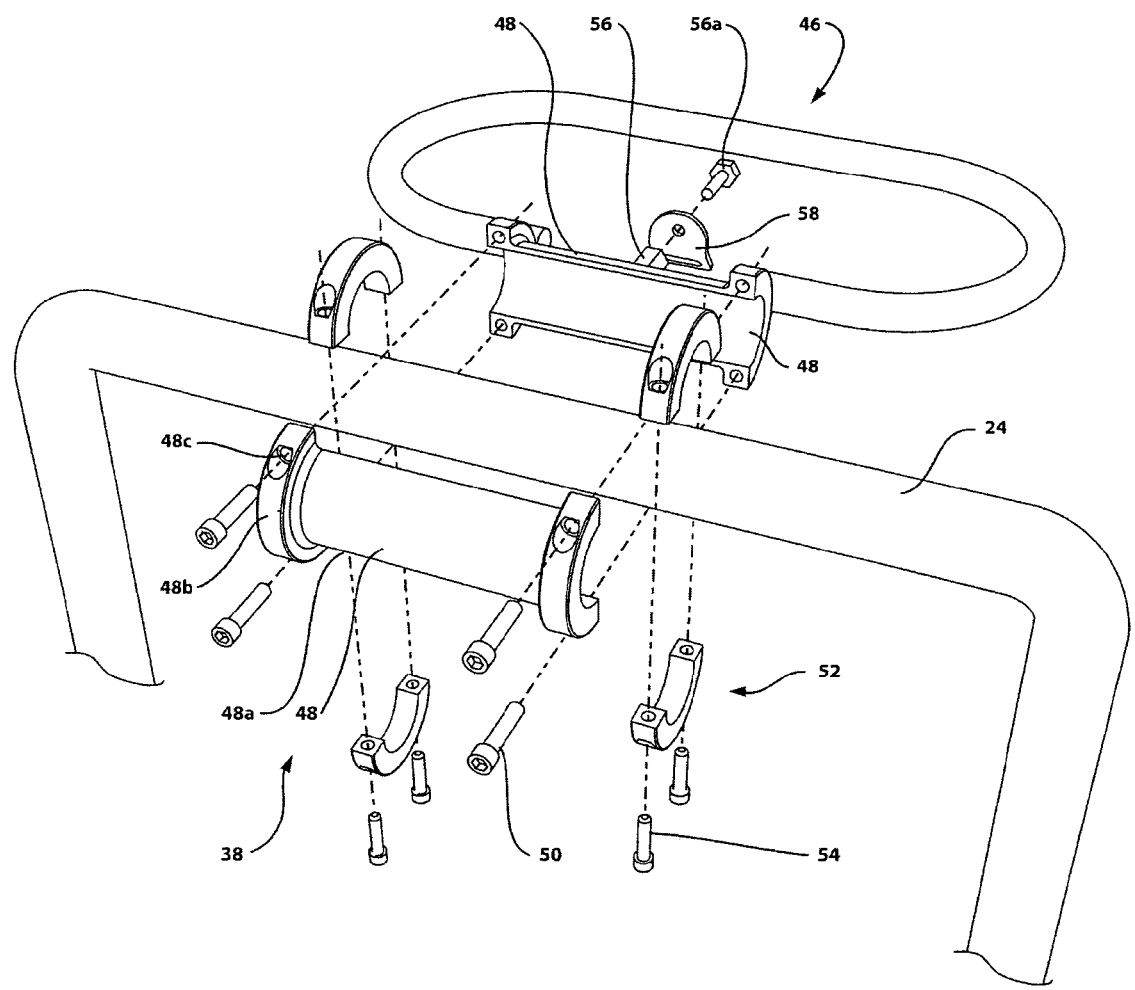
FIG. 5 an assembly view of the actuating member illustrated in FIG. 4.
Figure 6:
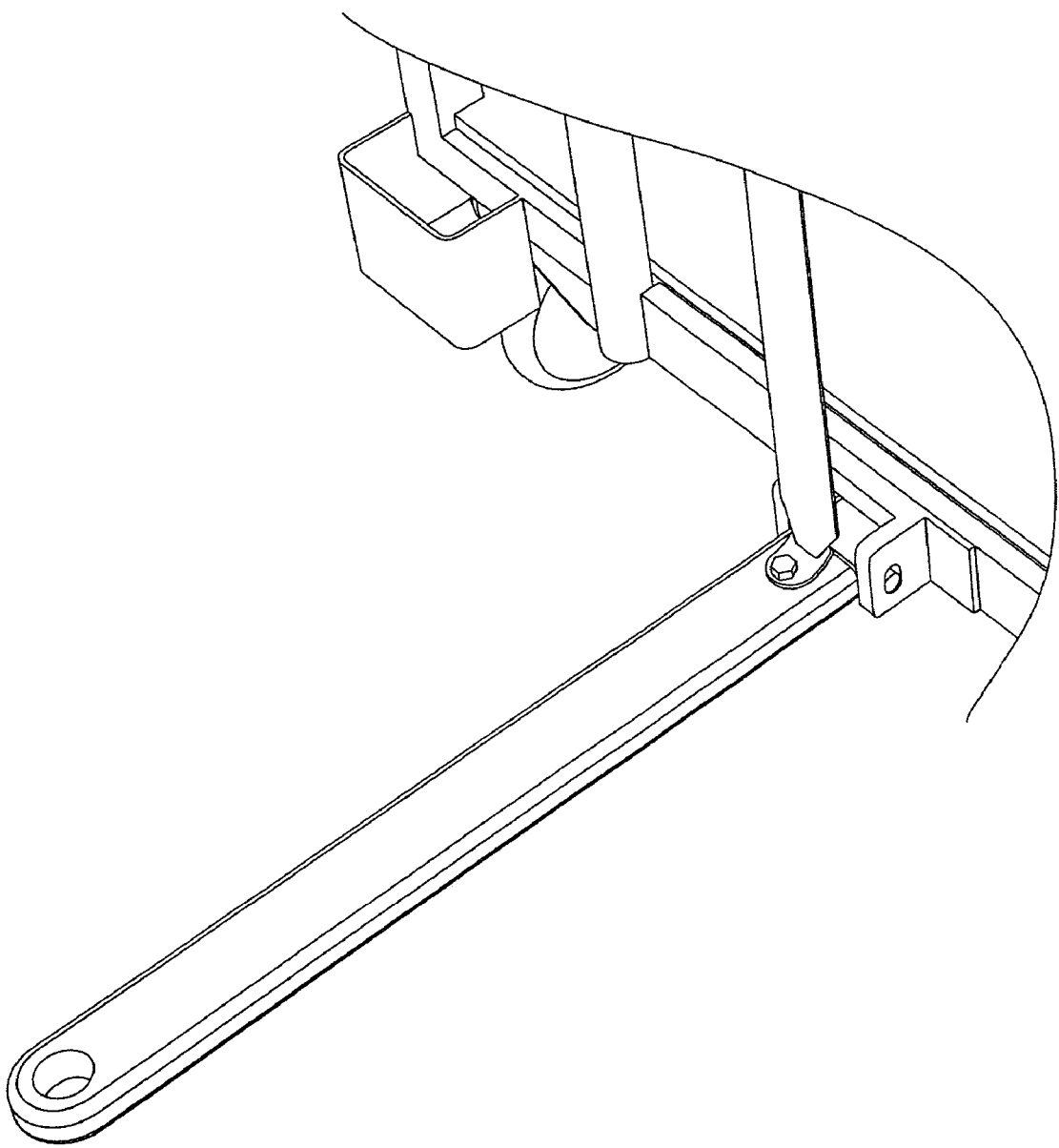
FIG. 6 is a magnified fragmentary perspective view of a connecting portion of the cart assembly of FIG. 1.

More details of the hoop member 46 and the sleeve portion 38 can be seen in FIGS. 4 and 5. The sleeve portion 38 includes a pair of sleeve halves 48 which are positioned on opposite sides of the cross bar 24 and held thereon by fasteners 50. Each sleeve half 48 has a semi cylindrical body 48a with a pair of enlarged collar portions 48b on each end thereof. The collar portions 48b have mating passages 48c to receive threaded fasteners 50 to secure the sleeve halves to one another over the cross bar 24 for a sliding fit therewith. The hoop member 46 has mounting portions 46a which are fixed to the corresponding collar portions 48b of one sleeve half. The hoop member 46, in this case, is fixed to the distant sleeve half as seen in FIG. 5.

A pair of retaining members, in the form of retaining rings 52, are anchored on either side of the sleeve portion 38 and secured to the cross bar 24 to inhibit travel of the sleeve portion 38 along the cross bar 24. In this case, the retaining rings are split in half, which halves are held in place by fasteners 54. A hex nut 56 is also secured to the same sleeve half as the hoop member and receives a fastener 56a to anchor an upper plate 58 into which the upper end of the strap 40 is anchored. In this case, the strap 40 may be replaced by a number of other tension members such as ropes, cords, chains, cables, and straps made from metal, glass, plastics or a combination of those and other materials. The hex nut 56 is centered and displaced approximately ten degrees in a forward position on the sleeve portion when the hoop member is in the lower hanging position. In other words, when the hoop member is at a "six o'clock" position, the hex nut is at a "seven o'clock" position, though other positions may also be used if desired. The length of the strap and the relative dimensions of the upper and lower plate members as well as other components associated therewith may be selected to have the hoop member lie in a "nine o'clock" position when the tongue is in its first connecting position. Other lengths of strap may be used if desired. It should be understood, that if the strap is so long that the hoop member swings significantly over the top of the cross bar 24, it may be obstructed by articles being carried by the cart assembly. The placement of the lower plate member may also in such as manner as to reduce the risk of tripping by the operator as may occur if the strap lower plate member, which risk may increase as the lower plate member is increasingly distant from the pivot pin.

Figure 1A:
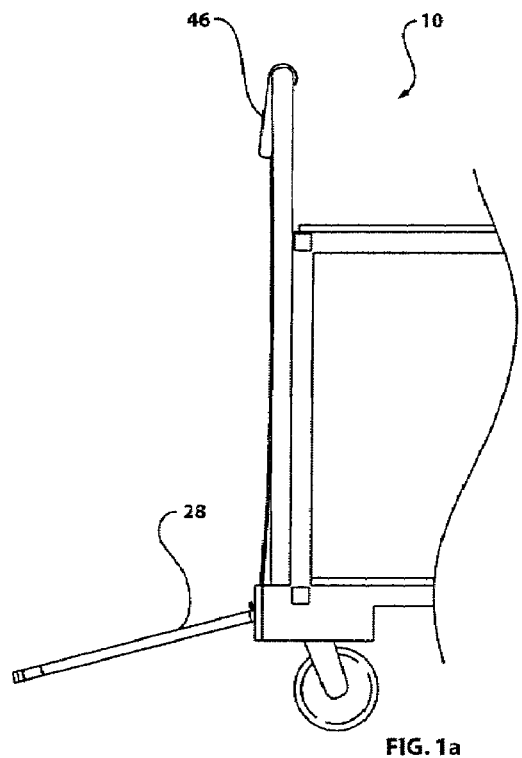
FIGS. 1a, 1b and 1c are sequential fragmentary side views of the cart assembly of FIG. 1 in several operative positions.
Figure 1B:
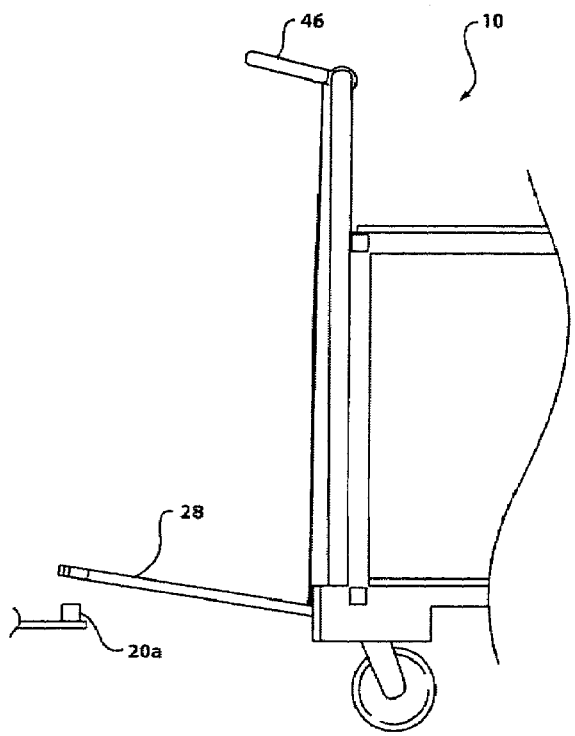
Figure 1C:
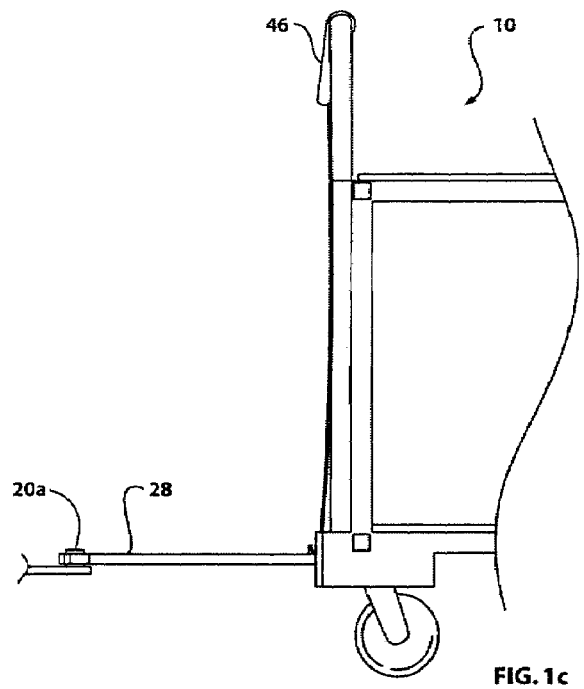

The cart assembly 10 may be used as follows. First, the human operator stands beside the cart assembly 10 and may wish to lift the hoop member 26 to lift the tongue 28 from the disconnected position of FIG. 1 and 1a to the connected position of FIG. 2 and 1c, thus causing the hoop member 46 to be rotated clockwise relative to the cross bar, causing the hex nut 56 and thus the upper end of the strap 40 to be raised, thereby taking up slack present in the strap until such time ands the strap 40 is tight and this, for example, may occur when the hoop member 46 is at a "seven o'clock" position, if the hoop member 46 were the hour hand on an analog clock (though other positions of the hoop member corresponding to this position may be achieved simply by changing the relative length of the strap 40, for instance). Further clockwise rotation of the hoop member 46 causes the strap 40 to lift the tongue 28. Thus, the hoop member will reach a position in which it is just higher than the draw pin 20a of the other cart assembly 20, as shown in FIG. 1b. With the front wheels 12a of the undercarriage 12 castered and with one hand on the hoop member 46, the operator may then grip the cross bar 24 and with the other hand and maneuver the cart assembly 10 until the draw passage 28d is directly above the draw pin 20a of the other cart assembly 20 and then may swing the hoop member 46 in a counter clockwise manner to lower the tongue 28 until the draw pin 20a passes through the draw passage 28d as shown in FIG. 2. The operator then lets the hoop member 46 fall to the hanging position as shown in FIG. 1c. This procedure may then be carried out in reverse order to disconnect the tongue 28 from the draw pin 20a. Thus, the cart assembly is advantageous because the operator may manipulate the orientation of the tongue 28 by moving the hoop member 46 without the need to bend down and can do so while steering or otherwise controlling the cart at the handle portion 22.

Figure 8:
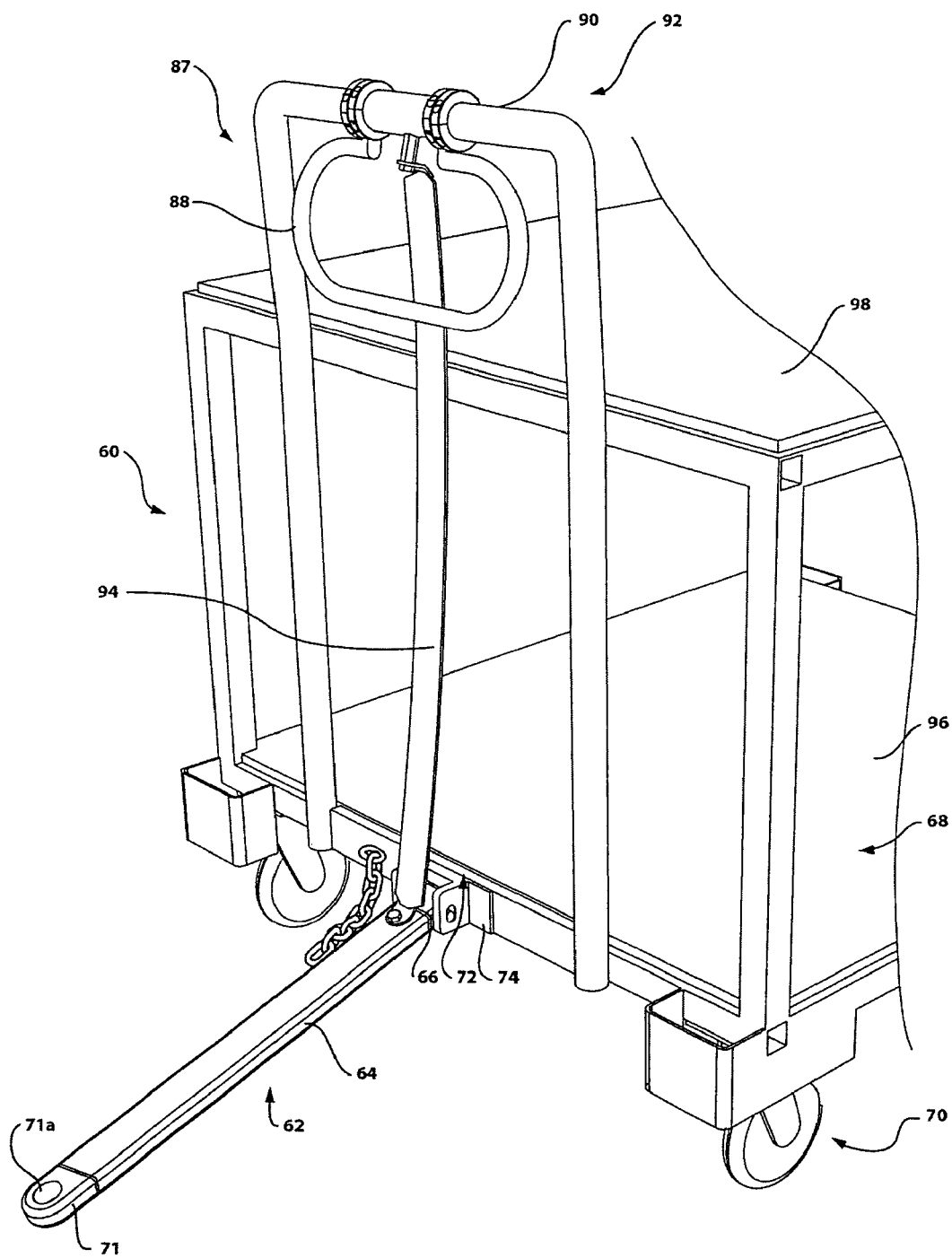
FIG. 8 is a fragmentary perspective view of another cart assembly.

Another cart assembly is shown at 60 in FIG. 8. In this case, the cart assembly has a tongue 62 with a central portion 64, a first end portion 66 for a pivot coupling with a cart frame 68 and/or an undercarriage 70 for movement about a pivot axis, as will be described. The tongue 62 also has a second end portion 71 providing a formation for connecting the cart assembly with an adjacent article, in this case a passage 71a to receive a draw pin. The first and second end portions 66, 71 may be formed by casting or molding or using other machining and/or fabricating techniques.

Figure 10:
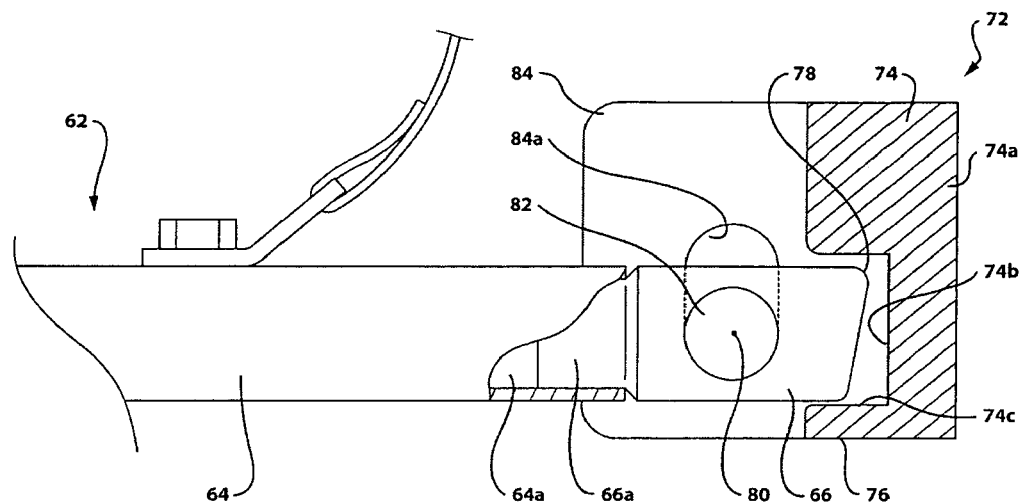
FIGS. 10 and 11 are part-sectional fragmentary side views of the connecting portion of FIG. 9 in two different positions.

Referring to FIG. 10, the central portion 64 is a hollow rectangular frame member with an inner passage 64a and one or both of the first and second end portions having complementary formations such as a plug portion 66a on the first end portion 66 for coupling with the frame member 64. If desired, the hollow frame member 64 may be of a shape other than rectangular, such as square or circular in cross section, as examples. Alternatively, the frame member may be solid in cross section with or without one or more flanges extending outwardly therefrom, so as to have a "U", an inverted "U", or a "C" shaped cross section, as a few of the many possible examples.

In addition, suitable means is provided for securing the first and second end portions 66, 71 on opposite ends of the central portion, such as by a force fit therebetween, or a welded or fastened connection or another method as desired.

Referring to FIGS. 8 and 10, an anchor member is provided at 72 having a base portion 74 with an outer rear surface 74a for mounting to the cart frame and/or undercarriage 68, 70. The anchor portion also has an inner surface 74b with a cavity 74c therein to engage the first end portion 66 in one operative position as will be described.

Figure 11:
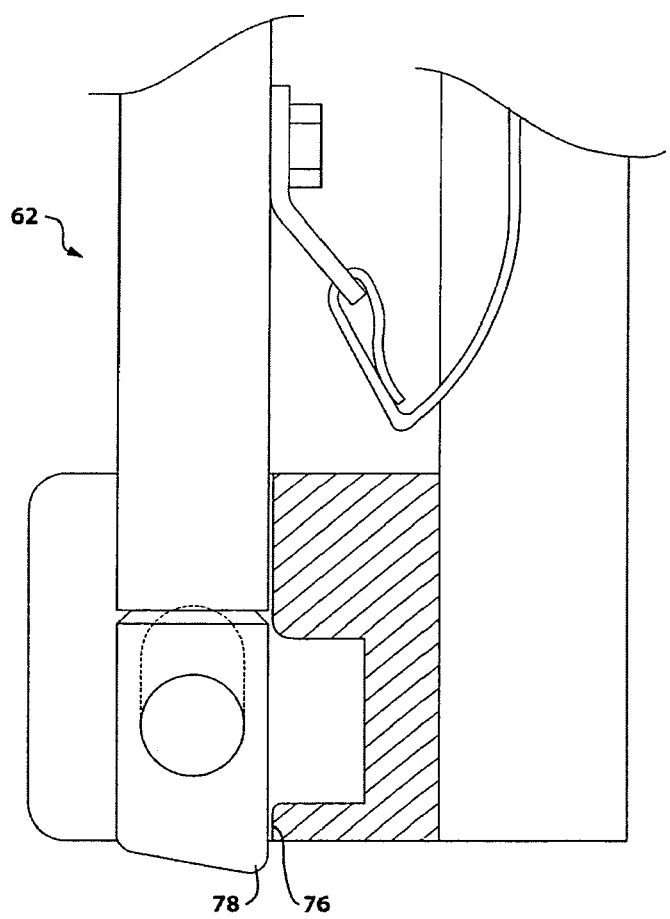

Engaging means is also provided for engaging the first end portion 66 in at least one operative position. In this case, the engaging means includes an abutment 76 and the first end portion 66 includes a projection 78 to be adjacent the abutment 76 in a first operative position. In this case, in the first operative position, the tongue 62 is in an upright storage position as shown in FIGS. 11 and 15 with the projection 78 adjacent the abutment 76 to prevent rotation of the tongue 62 about its pivot axis 80, provided by pivot pin 82 in passages 84a of webs 84.

Figure 9:
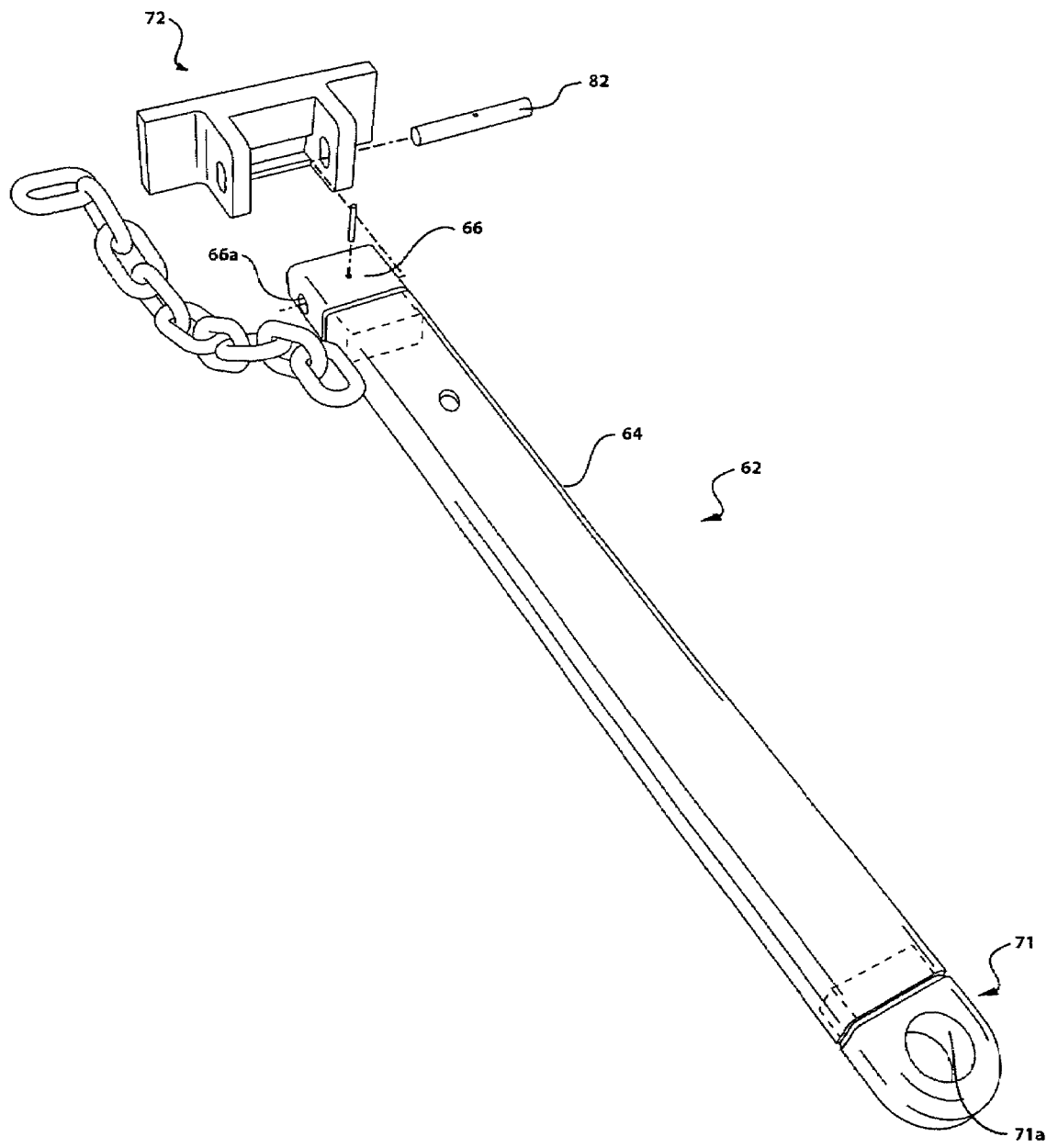
FIG. 9 is an assembly view of several a connecting portion of the cart assembly of FIG. 8.

Referring to FIG. 9, the first end portion 66 is provided with a transverse passage 66a to receive the pivot pin 82 in a manner similar to the earlier embodiment. Similarly, the pivot pin 82 may be replaced by other pivot arrangements. For instance, the first end portion 66 may be cast, moulded or otherwise fabricated to provide two projections extending laterally outwardly therefrom to provide pivot members to engage the passages 84a. The passages 84a may be replaced by other pivot pin receiving formations such as saddle joints and the like. Still further, the anchor portion 72 may be provided with a pivot formation and passages or saddle or other formations may be provided on the first end portion 66 to achieve a pivot coupling between the tongue 62 and the anchor member 72.

Figure 12:
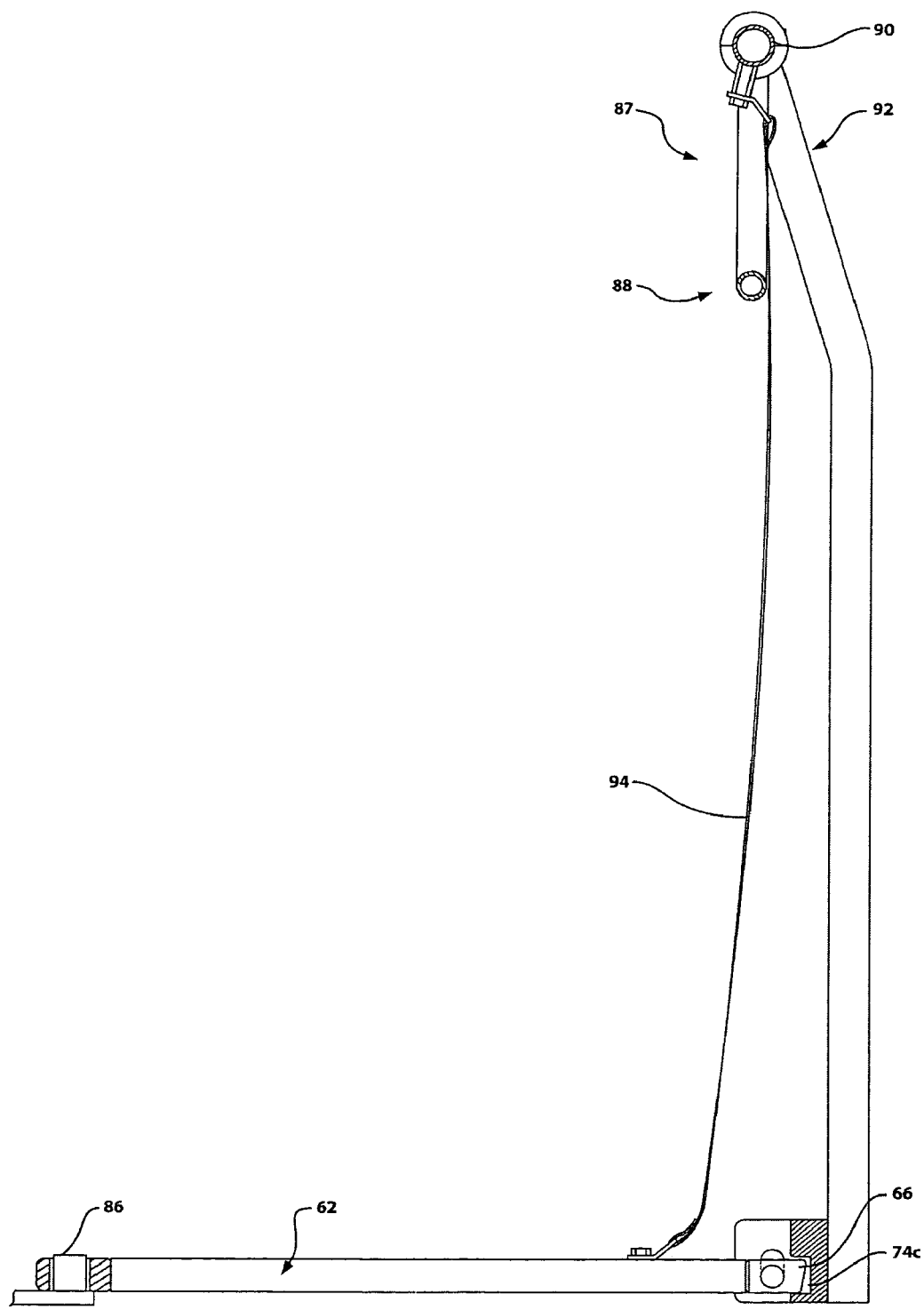
FIGS. 12 to 15 are side views of the connecting portion of FIG. 9 in four different positions.
Figure 14:
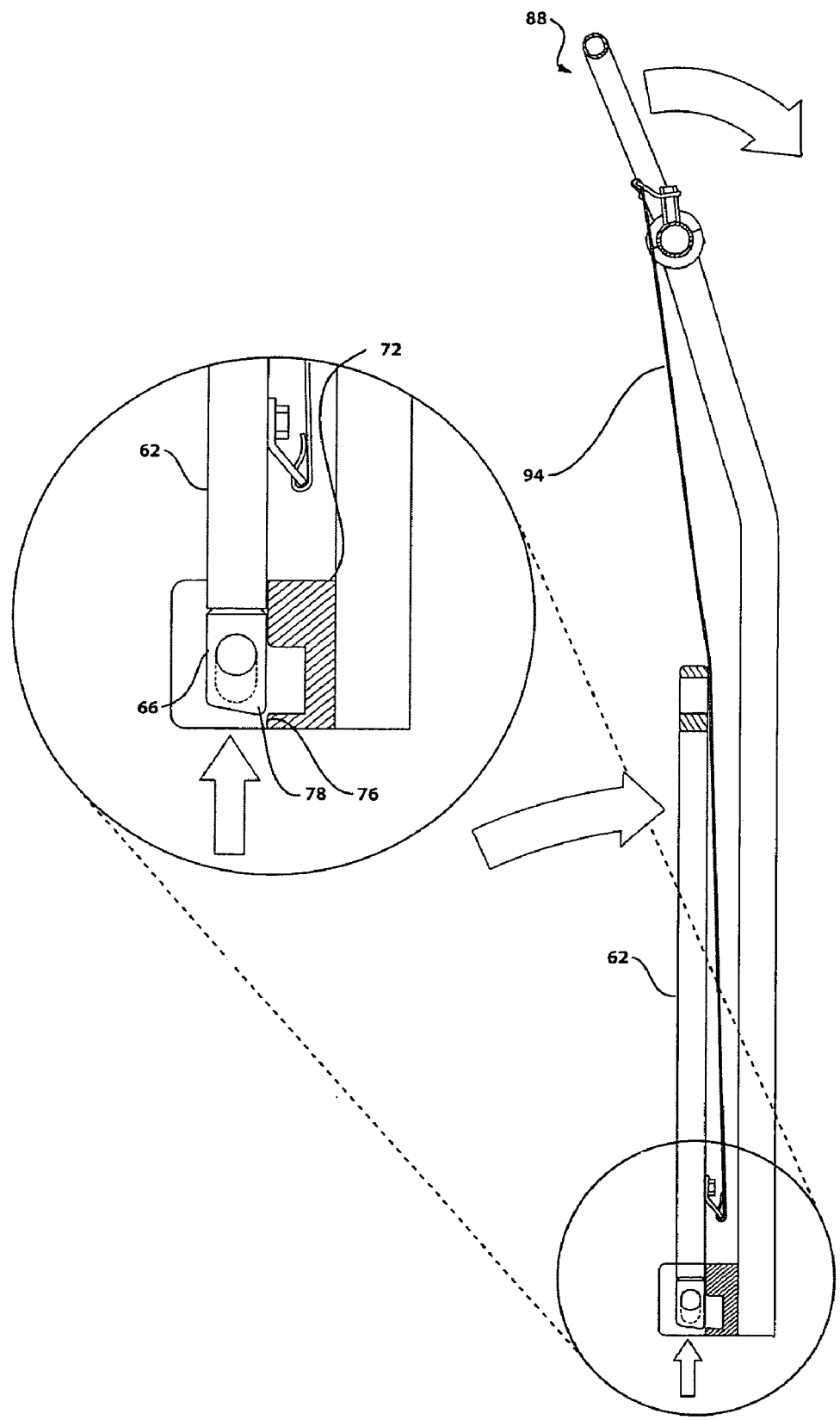
Figure 15:
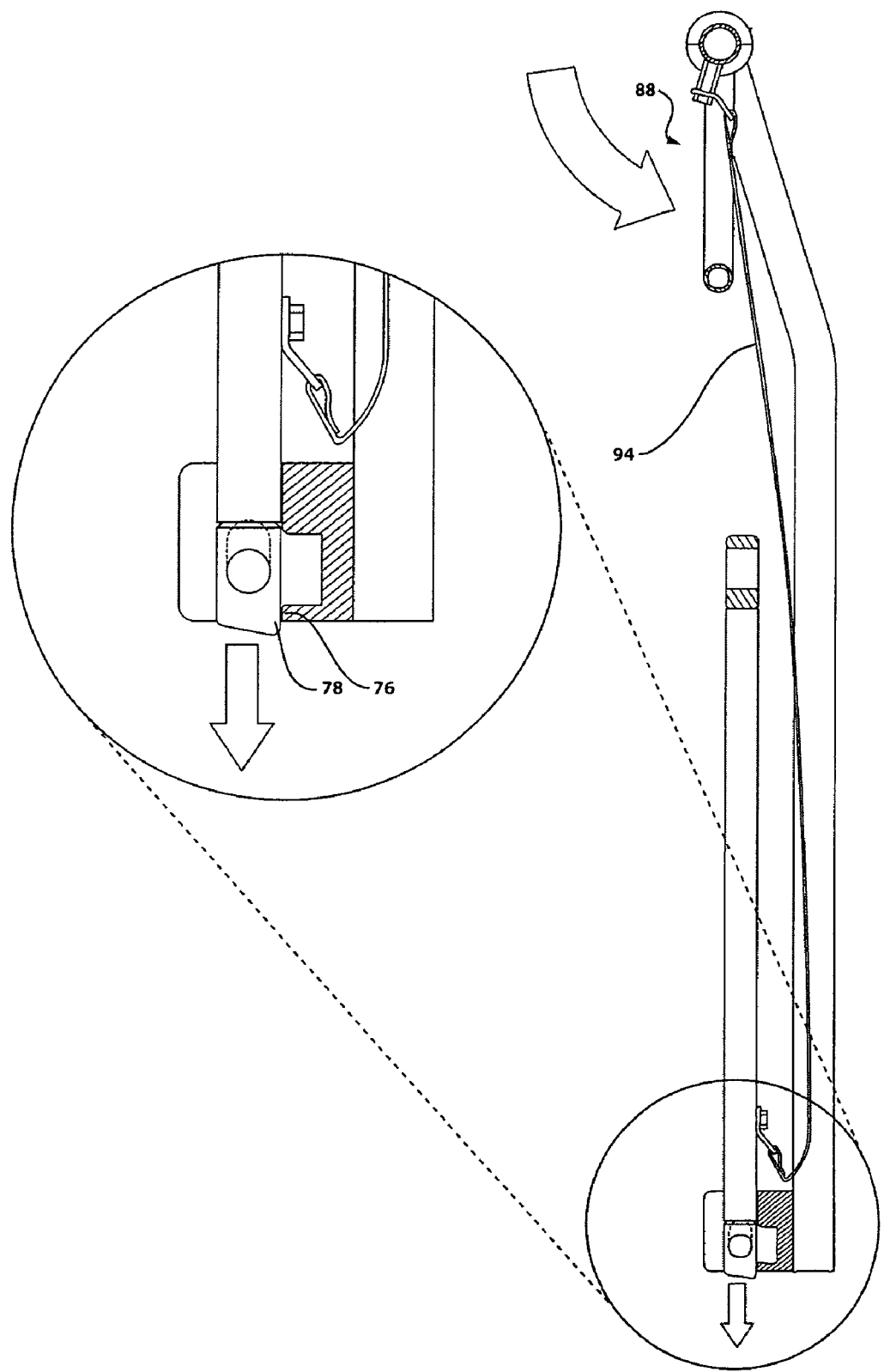

The tongue 62 is movable between the upright storage position of FIG. 15 and a second operative position which is shown in FIG. 14. In the second operative position, the projection 78 is spaced from the abutment 76 to permit the tongue 62 to be moved from its upright storage position to a third operative position as shown in FIGS. 10 and 12, namely when the tongue is in its connecting position. In this case, the tongue 62 engages the adjacent article by a way of a draw pin 86 as shown in FIG. 12 and the first end portion is received in the cavity 74c. As with the earlier cart assembly 10, the cart assembly 60 is provided with an actuating member 87 including a hoop member 88 rotatably mounted on the cross bar 90 of handle portion 92 and coupled with strap 94 to actuate the tongue 62.

Figure 13:
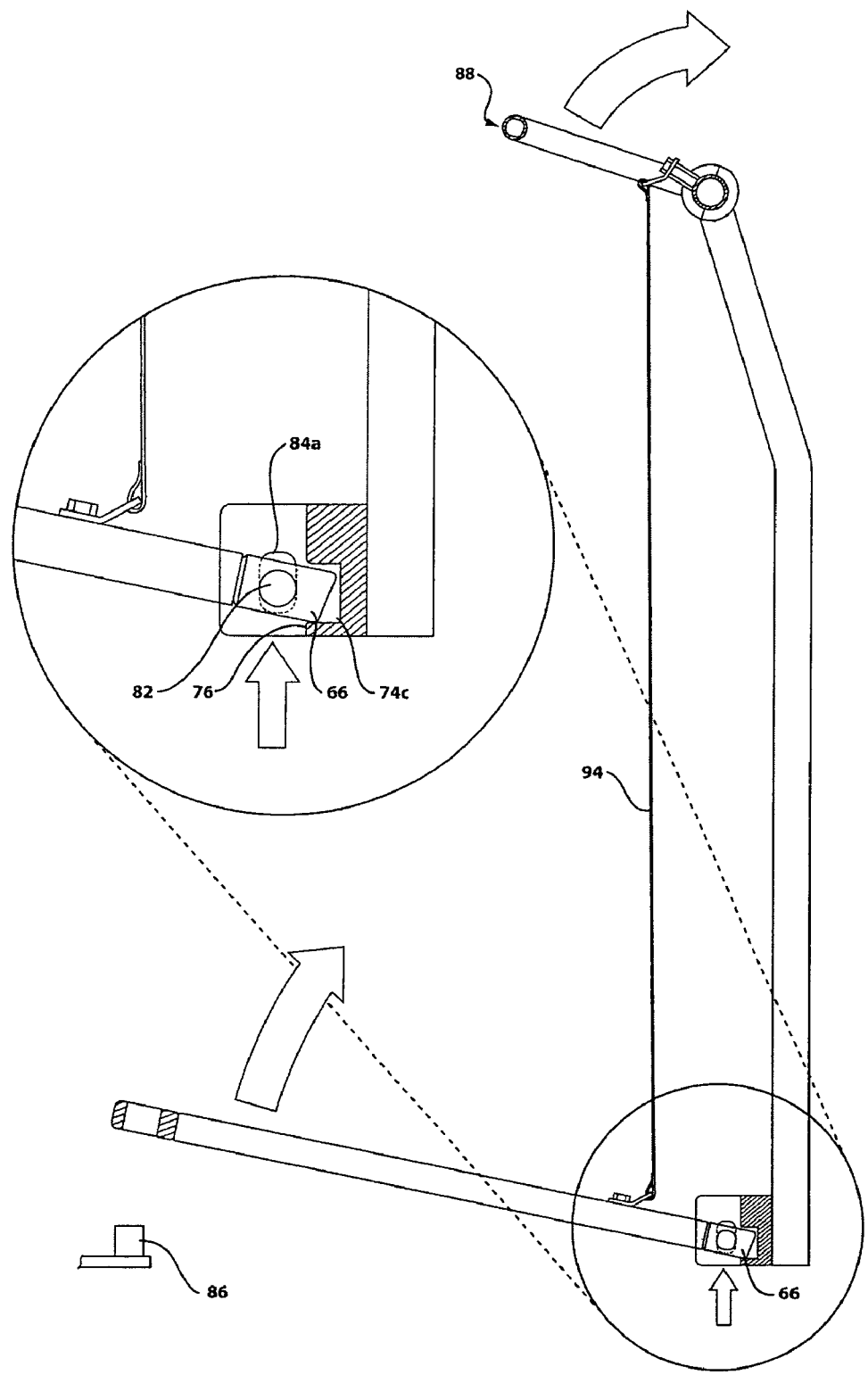

The cart assembly 60 is used as follows. As with the cart assembly 10, the human operator stands beside the cart assembly 60 and may wish to lift the hoop member 88 to lift the tongue 62 from the disconnected position of FIG. 8 to the connected position of FIG. 12. To do so, the operator grasps with one hand the hoop member 88 hanging in a "six o'clock" position beneath the cross bar 90 as shown in FIG. 8. The operator then swings the hoop member 88 clockwise a sufficient distance to tension the strap 94 to lift the tongue 62 above the draw pin 86, as shown in FIG. 13, at which time the operator may then maneuver the cart by grasping the handle portion with the other hand until the passage 71a is aligned with and just above the draw pin 86. The operator may then lower the tongue 62 onto the draw pin 86 by swinging the hoop member 88 slightly counter clockwise, at which time the cart assembly 60 is connected with the adjacent article, as shown in FIG. 12. The operator may then let the hoop member return to its hanging "six o'clock" position as shown in FIG. 12 with the strap 94 in a slack position and with the first end portion 66 extending into the cavity 74c.

If desired, the operator may transfer the tongue 62 to an upright storage position as shown in FIG. 14, by swinging the hoop member from its "six o'clock" position as shown in FIG. 12 in a clockwise direction as shown by the progression of views in FIGS. 13 and 14. Referring to FIG. 13, it can be seen that the first end portion 66 is still in the cavity 74c and there is a slight upward displacement of the pivot pin 82 in the passages 84a until the lower corner of the first end portion clears the abutment 76. Continued clockwise rotation of the hoop member 88 by the operator causes continued clockwise rotation of the tongue 62 toward an upright position, until such time as the projection 78 passes by the abutment 76 as shown in FIG. 14 while the central portion of the tongue 62 lies against the anchor member 72. The operator then relaxes the strap 94 and, under the action of gravity, the first end portion 66 moves downwardly relative to the pivot pin 82 causing the projection 78 to fall to a position adjacently the abutment 76 as shown in FIG. 15. In this position, then, the abutment obstructs the path of the projection 78 for the tongue to move from this upright storage position and therefore the tongue 62 is secured in its upright storage position as viewed in FIG. 15 and the operator then releases the hoop member 88 which then returns to its "six o'clock" position. When the tongue 62 is to be used, the operator simply returns the hoop member its position as shown in FIG. 14 which draws the tongue 62 upwardly under the upward force exerted on it by the strap and, with a slight nudge if need be from the operator, the tongue will then fall to an intermediate inclined position as the projection 78 is now clear from the abutment 66 to travel into the cavity 74c.

Referring to FIG. 8, the cart assembly 60 is shown to be of the type having a lower payload carrying surface 96 and an upper payload carrying surface 98. Of course, the actuating member 87 and the other features of the cart assemblies 10 and 60 shown herein may be applied to other cart assemblies which may one or no payload carrying surfaces, and/or may include bins, hooks, or parts carrying jigs or other structures.

Thus, the cart assembly provides a swinging handle which is fixed to the handle of the cart. A strap is secured to the handle and can be of a range of materials such as car "seat belt" webbed nylon, polypropylene and the like. By lifting the swinging handle, the operator can raise or lower the tongue, while steering the cart into the hitch of another cart without bending over. The cart assembly also allows for the cart's tongue to be raised to an upright position required for staging, that is by using the tongue to anchor the cart in a designated loading or unloading position, or vanning, that is by connecting the cart assembly either to another cart assembly or to a tractor unit for forming a power train of two or more cart assemblies.

The hoop member may be replaced by a range of other arms or actuating members to achieve the actuation of the tongue member by the operator in a standing position. The actuating member may be operatively connected to the tongue by other means in place of the strap, such as by chains, cables and the like. For that matter, the actuating member may be replaced by an automated control means for controlling the position of the tongue by corresponding movements of the hoop or equivalent actuating member, for example by the use of servo motors, pneumatic or hydraulic cylinders or the like.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A cart assembly, comprising an undercarriage supporting a cart frame, the undercarriage having one end and a connecting portion extending from cart frame and/or the undercarriage for connecting the cart assembly with an adjacent article, the cart frame including a handle portion disposed at an elevation for manipulation by a human operator in an upright standing position to steer or otherwise control the cart assembly, and an actuating member mounted on the handle portion for actuating the connecting portion between a first connecting position and a second disconnecting position, the connecting portion including a tongue and an anchor member to join the tongue with the cart frame and/or the undercarriage.

2. A cart assembly as defined in claim 1, wherein the tongue is movable between a generally horizontal first connecting position and a second inclined disconnecting position.

3. A cart assembly as defined in claim 2, wherein the actuating member is operatively connected to the tongue, so that displacement of the actuating member by the operator causes a corresponding displacement of the tongue.

4. A cart assembly as defined in claim 3, wherein the handle portion has a lateral portion, the actuating portion having a sleeve portion mounted on an outer surface of the lateral portion.

5. A cart assembly as defined in claim 4 wherein the handle portion includes a pair of upright portions, each having an upper end which is joined with a corresponding free end of the lateral portion.

6. A cart assembly as defined in claim 4, further comprising a tension member extending between the actuating member and the tongue.

7. A cart assembly as defined in claim 6 wherein the tension member includes one or more ropes, cords, chains, cables, and straps made from metal, glass, plastics or a combination thereof.

8. A cart assembly as defined in claim 6, further comprising a lower plate member secured to the tongue adjacent the first end portion, the plate member having a passage to receive a lower end of the tension member therein.

9. A cart assembly as defined in claim 8 wherein the actuating portion includes an actuating arm extending outwardly from the sleeve portion and at an elevation permitting the actuating arm to be manipulated by the human operator in the upright standing position.

10. A cart assembly as defined in claim 9 wherein the actuating arm includes a hoop member extending outwardly from the sleeve, the hoop member having first and second positions corresponding to the first and second positions of the tongue member.

11. A cart assembly as defined in claim 10 wherein the hoop member hangs downwardly from the lateral portion in one position and is generally horizontal or inclined in the second position.

12. A cart assembly as defined in claim 11 wherein the sleeve portion includes a pair of sleeve halves to be positioned on opposite sides of the lateral portion.

13. A cart assembly as defined in claim 12 wherein the hoop member is fixed to one of the sleeve halves.

14. A cart assembly as defined in claim 13, further comprising an upper plate member secured to the sleeve portion, the upper plate member having a passage to receive an upper end of the tension member therein.

15. A cart assembly as defined in claim 14, further comprising a pair of retaining members anchored on either side of the sleeve portion and secured to the lateral portion to inhibit travel of the sleeve portion along the lateral portion.

16. A cart assembly as defined in claim 15 wherein the retaining members are retaining rings.

17. A cart assembly as defined in claim 1, wherein the tongue has a first end portion providing one or more pivot pins for pivoted coupling with the anchor member.

18. A cart assembly as defined in claim 17 wherein the anchor member includes a pair of adjacent and outwardly extending webs, each web having a passage to receive the pivot pin.

19. A cart assembly as defined in claim 18 wherein the first end portion has a transverse passage to receive the pivot pin therein, the pivot pin extending through the transverse passage and beyond the first end portion to extend into each of said passages.

20. A cart assembly as defined in claim 1 wherein the adjacent article is another cart assembly.

21. A cart assembly as defined in claim 1, wherein the tongue has a central portion, a first end portion for a pivot coupling with the cart frame and/or undercarriage for movement about a pivot axis and a second end portion providing a formation for connecting the cart assembly with the adjacent article and means for securing the first and second end portions on opposite ends of the central portion.

22. A cart assembly as defined in claim 21 wherein the first and second end portions are formed by casting or molding.

23. A cart assembly as defined in claim 21 wherein the central portion is a frame member with an inner passage and one or both of the first and second end portions having complementary formations for coupling with the frame member.

24. A cart assembly as defined in claim 23 wherein the central portion is a hollow frame member with an inner passage and one or both of the first and second end portions having a projection to extend into the inner passage.

25. A cart assembly as defined in claim 24 wherein the hollow frame member is rectangular, square or circular in cross section.

26. A cart assembly as defined in claim 23 wherein the frame member is solid in cross section with one or more flanges extending outwardly therefrom.

27. A cart assembly as defined in claim 21 wherein the anchor member has a base portion with or without an outer surface for mounting to the cart frame and/or undercarriage and an inner surface and engaging means for engaging the first end portion in the second disconnecting position.

28. A cart assembly as defined in claim 27 wherein the engaging means includes an abutment, the first end portion including a projection to be adjacent the abutment in the second disconnecting position.

29. A cart assembly as defined in claim 28 wherein, in the second disconnecting position, the tongue is in an upright storage position with the projection adjacent the abutment to prevent rotation of the tongue about the pivot axis.

30. A cart assembly as defined in claim 29 wherein the tongue is movable between the upright storage position and an intermediate position wherein the projection is spaced from the abutment.

31. A cart assembly as defined in claim 30 wherein the first end portion has one or more pivot members and the anchor member has a pair of webs with pivot passages to receive the one or more pivot members.

32. A cart assembly as defined in claim 31 wherein the pivot passages are dimensioned to permit the one or more pivot members to be displaced along the web portions between the upright storage position and the intermediate position.

33. A cart assembly as defined in claim 32 wherein the base portion includes an inner surface having a cavity adjacent the abutment to receive a first end portion in the first connecting position.

34. A cart assembly comprising an undercarriage supporting a cart frame, a tongue for connecting the cart assembly with an adjacent article, and an anchor member to join the tongue with the cart frame and/or the undercarriage, the tongue having an end portion for a pivot coupling with the anchor member for movement about a pivot axis and a second end portion providing a formation for connecting the cart assembly with the adjacent article, the first end portion including a projection for movement along a travel path while the tongue travels from a first operative position to a second operative position, the anchor member further comprising abutment means for interrupting the travel path when the tongue is in the first operative position to inhibit movement of the tongue.

35. A cart assembly as defined in claim 34 wherein, in the first operative position, the tongue is in an upright storage position.

36. A cart assembly as defined in claim 35 wherein the tongue is movable between the upright storage position and a second operative position wherein the projection is spaced from the abutment element.

37. A cart assembly as defined in claim 36 wherein the first end portion has one or more pivot members and the anchor member has a pair of webs with pivot passages to receive the one or more pivot members.

38. A cart assembly as defined in claim 37 wherein the pivot passages are dimensioned to permit the one or more pivot members to be displaced along the web portions between the first and second operative positions.

39. A cart assembly as defined in claim 38 wherein the anchor member includes a base portion having a cavity adjacent the abutment element to receive the first end portion in a third operative position.

40. A cart assembly as defined in claim 39 wherein, in the third operative position, the tongue is connected with the adjacent article.

41. A cart assembly, comprising an undercarriage supporting a cart frame, a tongue for connecting the cart assembly with an adjacent article, a handle portion disposed at an elevation for manipulation by a human operator in an upright standing position to steer or otherwise control the cart assembly, and an actuating member mounted on the handle portion for movement between a first inoperative position in which the actuating member hangs downwardly from the handle portion and a second operative position, the actuating member operatively connected to the tongue by a tension member, so that displacement of the actuating member by the operator causes the tension member to lift the tongue between a first connecting position and a second disconnecting position.

42. A cart assembly, comprising undercarriage means, cart frame means supported by the undercarriage means, connecting means for connecting the cart frame with an adjacent article, the connecting means including a tongue and anchor means to join the tongue with the cart frame and/or the undercarriage, the cart frame means including handle means disposed at an elevation for manipulation by a human operator in an upright standing position to steer or otherwise control the cart assembly, and an actuating means associated with the handle means for actuating the connecting means between a first connecting position and a second disconnecting position.

43. A method of interconnecting a cart assembly with an adjacent article, comprising:
   providing a cart frame to support transportable articles and an undercarriage supporting a cart frame;
   locating a tongue at one end of the undercarriage;
   extending the tongue outwardly to be connectable with an adjacent article;
   providing a handle portion at an elevation so that the handle portion can be manipulated by a human operator in an upright standing position adjacent the cart assembly to steer or otherwise control the cart assembly; and positioning an actuating member on the handle portion for actuating the tongue between a first connecting position and a second disconnecting position.

44. A method as defined in claim 43, further comprising orienting the tongue to be movable between the first connecting position and the second disconnecting position, wherein the first connecting position is a generally horizontal and the second disconnecting position is generally inclined.

45. A method as defined in claim 44 further comprising operatively connecting the actuating member to the tongue, so that displacement of the actuating member by the operator causes a corresponding displacement of the tongue.

46. A method as defined in claim 45 further comprising orienting a hoop member to hang downwardly from the lateral portion and to be generally horizontal or inclined in the second position.

47. A method of interconnecting a cart assembly with an adjacent article, comprising:
 a step for providing a cart frame to support transportable articles and an undercarriage supporting a cart frame;
 a step for locating a tongue at one end of the undercarriage;
 a step for extending the tongue outwardly to be connectable with an adjacent article;
 a step for providing a handle portion at an elevation so that the handle portion can be manipulated by a human operator in an upright standing position adjacent the cart assembly to steer or otherwise control the cart assembly; and
 a step for positioning an actuating member on the handle portion for actuating the tongue between a first connecting position and a second disconnecting position.

48. A method as defined in claim 47, further comprising a step for orienting the tongue to be movable between the first connecting position and the second disconnecting position, wherein the first connecting position is a generally horizontal and the second disconnecting position is generally inclined.

49. A method as defined in claim 48 further comprising a step for operatively connecting the actuating member to the tongue, so that displacement of the actuating member by the operator causes a corresponding displacement of the tongue.

50. A method as defined in claim 49 wherein, in the first position, a hoop member hangs downwardly from the lateral portion and is generally horizontal or inclined in the second position.

* * * * *